US012747378B2

(12) United States Patent
Miyazaki et al.

(10) Patent No.: US 12,747,378 B2
(45) Date of Patent: Sep. 29, 2026

(54) ADHESIVE COMPOSITION AND ADHESIVE SHEET

(71) Applicants: Soken Chemical & Engineering Co. Ltd., Toshima-ku (JP); Heraeus Deutschland Gmbh & Co. KG, Hanau (DE); Heraeus Kabushiki Kaisha, Bunkyo-ku (JP)

(72) Inventors: Tomohiro Miyazaki, Toshima-ku (JP); Kento Watanabe, Toshima-ku (JP); Syuji Okamoto, Toshima-ku (JP); Wilfried Lövenich, Hanau (DE); Armin Sautter, Hanau (DE); Tetsuya Suzuki, Bunkyo-ku (JP)

(73) Assignees: SOKEN CHEMICAL & ENGINEERING CO. LTD., Tokyo (JP); HERAEUS EPURIO GMBH, Hanau (DE); HERAEUS KABUSHIKI KAISHA, Tokyo (JP)

(*) Notice: Subject to any disclaimer, the term of this patent is extended or adjusted under 35 U.S.C. 154(b) by 426 days.

(21) Appl. No.: 16/637,509

(22) PCT Filed: Aug. 10, 2017

(86) PCT No.: PCT/JP2017/029231

§ 371 (c)(1),
(2) Date: Feb. 7, 2020

(87) PCT Pub. No.: WO2019/030936

PCT Pub. Date: Feb. 14, 2019

(65) Prior Publication Data

US 2020/0216723 A1 Jul. 9, 2020

(51) Int. Cl.

| | |
|---|---|
| ***C09J 7/30*** | (2018.01) |
| ***C09J 123/00*** | (2006.01) |
| ***C09J 133/08*** | (2006.01) |
| ***C09J 133/14*** | (2006.01) |
| ***C09J 175/04*** | (2006.01) |
| ***C09J 183/04*** | (2006.01) |
| *C09J 9/02* | (2006.01) |

(52) U.S. Cl.

CPC ............... *C09J 133/08* (2013.01); *C09J 7/30* (2018.01); *C09J 123/00* (2013.01); *C09J 133/14* (2013.01); *C09J 175/04* (2013.01); *C09J 183/04* (2013.01); *C09J 9/02* (2013.01); *C09J 2301/314* (2020.08); *C09J 2423/00* (2013.01); *C09J 2433/00* (2013.01); *C09J 2475/00* (2013.01); *C09J 2483/00* (2013.01); *Y10T 428/2883* (2015.01); *Y10T 428/2891* (2015.01); *Y10T 428/2896* (2015.01)

(58) Field of Classification Search

None

See application file for complete search history.

(56) References Cited

U.S. PATENT DOCUMENTS

| | | | | |
|---|---|---|---|---|
| 5,645,764 | A * | 7/1997 | Angelopoulos | C09J 9/02 252/500 |
| 2006/0202171 | A1 | 9/2006 | Yoshida et al. | |
| 2009/0294735 | A1 | 12/2009 | Yoshida et al. | |
| 2012/0202055 | A1 | 8/2012 | Kataoka et al. | |
| 2013/0085215 | A1* | 4/2013 | Shitara | C09J 7/385 524/100 |
| 2013/0270537 | A1 | 10/2013 | Lovenich et al. | |
| 2020/0214632 | A1* | 7/2020 | Neumann | C09J 133/08 |
| 2024/0294679 | A1* | 9/2024 | Sauer-Stieglitz | C09D 5/24 |

FOREIGN PATENT DOCUMENTS

| | | |
|---|---|---|
| CN | 101137718 | 3/2008 |
| CN | 101921478 | 12/2010 |
| EP | 1857504 | 11/2007 |
| EP | 2617757 | 7/2013 |
| JP | 2005126081 A | 5/2005 |
| JP | 2007051173 | 3/2007 |
| JP | 2013222526 | 10/2013 |
| JP | 2016023287 | 2/2016 |
| KR | 20050051089 A | 6/2005 |

(Continued)

OTHER PUBLICATIONS

Satoru, Matsubayashi et al., "Conductive Polymer Solution And Conductive Coating Film", English translation of JP 2016023287 A,, Feb. 8, 2016 (Year: 2016).*

Koyama et al., Optical member adhesive composition, Adhesive sheet using same, Optical member provided with adhesive layer, and Flat panel display, machine translation of JPWO2013099683 A1, published May 7, 2015 (Year: 2015).*

English translation of Yuji, Koyama et al. (WO2013099683 A1), Jul. 4, 2013 (Year: 2013).*

Supplementary European Search Report dated Feb. 11, 2021 for European Patent Application 17920928.3.

International Search Report and Written Opinion dated Oct. 31, 2017 for International Patent Application PCT/JP2017/029231.

*Primary Examiner* — Anish P Desai

(74) *Attorney, Agent, or Firm* — Panitch Schwarze Belisario & Nadel LLP

(57) ABSTRACT

An object of the present invention is to provide an adhesive composition and an adhesive sheet that are stably dissolved or dispersed in a solvent or a dispersion medium having low polarity, have high total light transmittance and have high-function antistatic properties. An adhesive composition including (A) an adhesive polymer comprising repeated structures which consist of one or more kinds of (meth) acryl-based, urethane-based, silicone-based and polyolefin-based unit structures, (B) a conductive polymer complex including a conjugated polymer, and a polyanion having a block copolymer structure, and (C) a nonaqueous solvent or dispersion medium, in which the conductive polymer complex is contained by 0.1 parts by mass or higher and lower than 10 parts by mass relative to 100 parts by mass of the adhesive polymer.

19 Claims, No Drawings

(56) References Cited

FOREIGN PATENT DOCUMENTS

| | | | | | |
|---|---|---|---|---|---|
| KR | 1020070120126 | | 12/2007 | | |
| KR | 20090120703 | | 11/2009 | | |
| TW | 201639934 | A | 11/2016 | | |
| WO | 2006095595 | | 9/2006 | | |
| WO | WO-2013099683 | A1 * | 7/2013 | .............. | C09J 11/06 |

* cited by examiner

ADHESIVE COMPOSITION AND ADHESIVE SHEET

CROSS REFERENCE TO RELATED APPLICATION

This aplication is a U.S. national phase filing of International Patent Application Number PCT/JP2017/029231 filed Aug. 10, 2017. The disclosure of this application is hereby incorporated by reference in its entirety.

TECHNICAL FIELD

The present invention relates to adhesive compositions and adhesive sheets, in particular, to adhesive compositions having high antistatic properties during peeling or the like, and adhesive sheets using the same.

BACKGROUND ART

An adhesive agent having antistatic properties is used as an adhesive layer of a surface protect film, and, for example, is used to prevent flaws or contaminations from adhering on a surface during processing or transporting an optical component or an electronic component such as a Flat Panel Display (FPD). When an adhesive agent having antistatic properties like this is used in a surface protect film, adherence of extraneous materials such as dust or dirt to a target object to which the adhesive sheet was adhered, due to electrification of static electricity generated during peeling, or electric inconvenience to the electronic components or the like due to electrostatic discharging may be prevented.

Here, as antistatic agents that impart antistatic performance to the adhesive agent, ionic compounds, inorganic fillers and the like may be used. However, in the case where a surfactant or an ionic compound such as an ionic liquid is used by mixing in the adhesive agent, since the antistatic agent bleeds out from the adhesive layer, there was a problem that a surface of an adherend is contaminated when the adhesive layer is peeled. Further, in the case where an inorganic filler such as a carbonaceous material, a metal, or a metal oxide is mixed and used, because many of the inorganic fillers are colored, there was a problem that a light transmittance of the protect film is degraded or a problem that a mixing property when mixing the adhesive agent and an organic solvent or temporal dispersion stability after mixing deteriorate.

On the other hand, in the case where a conductive polymer having high light transmittance and conductivity is used as the antistatic agent, high-function antistatic properties may be expected.

However, since the conductive polymers that are widely used in the present time are formed of a water dispersion type poly(3,4-ethylenedioxythiophene)polystyrene sulfonate (PEDOT/PSS), it was difficult to add them directly to an adhesive agent of a nonaqueous solvent system.

Therefore, in order to apply as the antistatic agent of the adhesive agent, an adhesive sheet is known in which the antistatic performance is imparted by forming an adhesive layer and an antistatic layer from separate layers (Patent Document 1). However, the adhesive sheet of Patent Document 1 is cumbersome in the manufacturing step because the adhesive layer and the antistatic layer have to be separately formed.

Further, it has been studied to use an antistatic agent by dispersing in an organic solvent by using a phase transfer catalyst in an aqueous dispersion of PEDOT/PSS (Patent Document 2). However, according to the study of Patent Document 2, since only a dispersion medium having relatively high polarity such as methyl ethyl ketone may be used to disperse and a dispersion medium having low polarity does not stably disperse, combinations with the adhesive agents that can use this dispersion liquid are largely limited.

On the other hand, as conductive polymers that can be stably dispersed even in nonpolar solvents, a conductive polymer complex containing polythiophene and a sulfonated synthetic rubber based on a styrene-diene block copolymer is known (Patent Document 3). However, regarding adjustment of the antistatic performance when this complex is used, further knowledge is required.

CITATION LIST

Patent Literature

[PTL 1] U.S. Published Patent Application Publication, No. 2012/0202055, Specification

[PTL 2] U.S. Published Patent Application Publication, No. 2006/0202171, Specification

[PTL 3] U.S. Published Patent Application Publication, No. 2013/0270537, Specification

SUMMARY OF INVENTION

Solution to Problem

The present invention intends to provide an adhesive composition that is dissolved or dispersed stably in a solvent or a dispersion medium having low polarity, has high light transmittance, and has high-function antistatic performance, and an adhesive sheet using the same.

Means for Solving the Problems

In order to solve the above problems, after extensive studies, the present inventors found that when a specific adhesive polymer and a conductive polymer are contained and a ratio of these is set within a predetermined range, the above object can be achieved.

(1) A first invention of the present invention is an adhesive composition that comprises (A) an adhesive polymer comprising repeated structures which consist of one or more kinds of (meth)acryl-based, urethane-based, silicone-based and polyolefin-based unit structures, (B) a conductive polymer complex including a conjugated polymer, and a polyanion having a block copolymer structure, and (C) a nonaqueous solvent or dispersion medium, in which the conductive polymer complex is contained by 0.1 parts by mass or higher and lower than 10 parts by mass relative to 100 parts by mass of the adhesive polymer.

(2) A second invention of the present invention is an adhesive composition in which, in the first invention, a concentration of metal ions in the adhesive composition is lower than 10,000 ppm relative to the (B) conductive polymer complex by mass ratio.

(3) A third invention of the present invention is an adhesive composition in which, in the first or second invention, an adhesive layer obtained by forming and drying the adhesive composition such that a dry film thickness of the adhesive layer is 10 μm has surface resistivity of smaller than $1\times10^{13}\Omega/\square$, a total light transmittance of 80% or higher, and a haze of 3% or smaller.

(4) A fourth invention of the present invention is an adhesive sheet provided with an adhesive layer formed from the adhesive composition in any one of the first to third inventions.

(5) A fifth invention of the present invention is an adhesive sheet in which, in the fourth invention, the adhesive layer is laminated on a surface of a substrate, and, when a surface free energy in a surface of a coated film obtained by coating the adhesive polymer alone is assumed as X, a surface free energy in a surface of the substrate is assumed as Y, and a surface free energy in a surface of a coated film obtained by coating the conductive polymer complex alone is assumed as Z, the following formula (a) and formula (b) are satisfied.

[Math.1]

$$|X-Y|\geq 3.0\text{ mN/m} \quad (a)$$

[Math.2]

$$X\leq Z\leq Y\text{ or }Y\leq Z\leq X \quad (b)$$

(6) A sixth invention of the present invention is an adhesive sheet in which, in the fourth invention, when a surface free energy in a surface of a coated film obtained by coating the adhesive polymer alone is assumed as X and a surface free energy in a surface of a coated film of a solution containing the adhesive polymer and the conductive polymer complex is assumed as W, the following formula (c) is satisfied.

[Math.3]

$$|X-W|\geq 0.1\text{ mN/m} \quad (c)$$

(7) A seventh invention of the present invention is an adhesive sheet in which, in the fourth invention, the adhesive layer is laminated on a surface of the substrate, and, when a surface free energy in a surface of the substrate is assumed as Y, and a surface free energy in a surface of a coated film of a solution containing the adhesive polymer and the conductive polymer complex is assumed as W, the following formula (d) is satisfied.

[Math.4]

$$|Y-W|\geq 4.0\text{ mN/m} \quad (d)$$

(8) An eighth invention of the present invention is an adhesive sheet in which, in any one of the fourth to seventh inventions, a peeling charge amount when adhering to an adherend made of triacetyl cellulose followed by peeling at a speed of 30 m/minute is 0.9 kV or smaller.

(9) A ninth invention of the present invention is a protect film formed of the adhesive sheet of any one of the fourth to the eighth inventions.

Advantageous Effects of Invention

According to the present invention, an adhesive composition and an adhesive sheet which are stably dissolved or dispersed in a solvent or dispersion medium having low polarity, have a high light transmittance, and have high-function antistatic characteristics may be obtained.

Further, since the adhesive composition of the present invention has high-function antistatic characteristics and may reduce adhesion of extraneous materials due to electrification of static electricity generated during peeling and electrical inconveniences to electronic components due to static discharge, the adhesive composition may be expected as a surface protect film.

DESCRIPTION OF EMBODIMENTS

In the followings, embodiments of the present invention will be described. However, these are shown only illustratively and it goes without saying that various modifications can be applied as long as these do not deviate from a technical idea of the present invention.

<<Adhesive Composition>>

An adhesive composition of the present invention includes (A) an adhesive polymer comprising repeated structures which consist of one or more kinds of (meth) acryl-based, urethane-based, silicone-based and polyolefin-based unit structures, and (B) a conductive polymer complex including a conjugated polymer and a polyanion having a block copolymer structure, which are dissolved or dispersed in (C) a nonaqueous solvent or nonaqueous dispersion medium.

A "solution" in the present specification is a concept including also a dispersion liquid, and indicates a state of being dissolved or dispersed in a solvent or a dispersion medium.

<(A) Adhesive Polymer>

An adhesive polymer used in the adhesive composition of the present invention is a polymer having adhesiveness at least at a use temperature and preferably having adhesiveness at room temperature. The adhesive polymer has repeated structures which are obtained by repeating one or more kinds of (meth)acryl-based, urethane-based, silicone-based and polyolefin-based unit structures, and may be a copolymer. When the adhesive polymer like this is used, the adhesive physical properties of the adhesive composition may be suitably adjusted.

In the followings, each of a (meth)acryl-based polymer that is a polymer having a (meth)acryl-based unit structure, an urethane-based polymer that is a polymer having a urethane-based unit structure, a silicone-based polymer that is a polymer having a silicone-based unit structure, and a polyolefin-based polymer that is a polymer having a polyolefin-based unit structure will be described.

(A1) (Meth)Acryl-Based Polymer

Among these, as the (meth)acryl-based polymer, those which are formed by polymerizing a monomer having a polymerizable unsaturated bond having at least one of an acrylic acid ester and a methacrylic acid ester as a main component may be used. That is, a repeating unit ((meth) acrylic acid ester component unit) derived from at least one of acrylic acid ester and methacrylic acid ester is contained by 50% by mass or more, preferably by 70% by mass or more, and more preferably by 90% by mass or more in terms of monomers. Specific examples of the (meth)acryl-based polymers include a copolymer of n-butyl acrylate/2-ethylhexyl acrylate/2-hydroxyethyl acrylate, a copolymer of n-butyl acrylate/2-ethylhexyl acrylate/2-hydroxyethyl acrylate/acrylic acid, a copolymer of 2-ethylhexyl acrylate/2-hydroxyethyl acrylate, a copolymer of 2-ethylhexyl acrylate/2-hydroxyethyl acrylate/acrylic acid, a copolymer of 2-methoxyethyl acrylate/2-hydroxyethyl acrylate/acrylic acid, and a copolymer of 2-methoxyethyl acrylate/2-hydroxyethyl acrylate/acryl amide.

As acrylic acid esters or methacrylic acid esters that derive repeating units of (meth)acryl-based polymers, esters between alcohols having an alkyl group having 1 to 20 carbon atoms and acrylic acid or methacrylic acid, esters between alicyclic alcohols having 3 to 14 carbon atoms and acrylic acid or methacrylic acid, or esters between aromatic alcohols having 6 to 14 carbon atoms and acrylic acid or methacrylic acid may be used.

Here, examples of esters between alcohols having an alkyl group having 1 to 20 carbon atoms and acrylic acid or methacrylic acid include (meth)acrylic acid alkyl esters such as methyl (meth)acrylate ethyl (meth)acrylate, propyl (meth) acrylate, butyl (meth)acrylate, pentyl (meth)acrylate, hexyl (meth)acrylate, 2-ethylhexyl (meth)acrylate, octyl (meth) acrylate, nonyl (meth)acrylate, decyl (meth)acrylate, and dodecyl (meth)acrylate. An alkyl group having 3 or more carbon atoms may have a straight chain structure or a branched structure. Further, examples of esters between alicyclic alcohols having 3 to 14 carbon atoms and acrylic acid or methacrylic acid include cyclohexyl (meth)acrylate and isobornyl (meth)acrylate, and examples of esters between aromatic alcohols having 6 to 14 carbon atoms and acrylic acid or methacrylic acid include (meth)acrylic acid aryl esters such as phenyl (meth)acrylate, benzyl (meth) acrylate and phenoxyethyl (meth)acrylate. Such (meth) acrylic acid esters may be used alone or in a combination thereof.

Further, the (meth)acryl-based polymer may have repeating units derived from monomers copolymerizable with (meth)acrylic acid esters, other than the above (meth)acrylic acid ester component units. Examples of the monomers like this include alkoxyalkyl (meth)acrylates such as (meth) acrylic acid, methoxyethyl (meth)acrylate, ethoxyethyl (meth)acrylate, propoxyethyl (meth)acrylate, butoxyethyl (meth)acrylate, and ethoxypropyl meth)acrylate; salts such as alkali metal (meth)acrylate; di(meth)acrylic acid esters of (poly)alkylene glycol such as di(meth)acrylic acid ester of ethylene glycol, di(meth)acrylic acid ester of diethylene glycol, di(meth)acrylic acid ester of triethylene glycol, di(meth)acrylic acid ester of polyethylene glycol, di(meth) acrylic acid ester of propylene glycol, di(meth)acrylic acid ester of dipropylene glycol and di(meth)acrylic acid ester of tripropylene glycol; poly(meth)acrylic acid esters such as trimethylol propane tri(meth)acrylic acid ester; hydroxy group-containing vinyl compounds such as (meth)acrylonitrile, vinyl acetate, 2-hydroxyethyl (meth)acrylate, 2-hydroxypropyl (meth)acrylate, 4-hydroxybutyl (meth)acrylate, monoesters between (meth)acrylic acid and polypropylene glycol or polyethylene glycol; and adducts between lactones and 2-hydroxyethyl (meth)acrylate; unsaturated carboxylic acid such as itaconic acid, crotonic acid, maleic acid and fumaric acid (excluding (meth)acrylic acid); salts of these and (partially) esterified compounds and acid anhydrides of these; amide group-containing vinyl monomers such as (meth)acrylamide, N-methylol (meth)acrylamide, N-methoxyethyl (meth)acrylamide and N-butoxymethyl (meth)acrylamide; and macromonomers having a radical polymerizable vinyl group at a terminal of a monomer to which a vinyl group is polymerized. The monomers may be copolymerized alone or in a combination with (meth)acrylic acid ester.

A weight-average molecular weight of the (meth)acryl-based polymer is preferably 50,000 or larger and 2,000,000 or smaller, and more preferably 100,000 or larger and 1,500,000 or smaller from the viewpoint of providing adhesiveness under room temperature. When the weight-average molecular weight is smaller than 50,000, the heat resistance of the obtained adhesive layer may be drastically degraded, and, when the weight-average molecular weight exceeds 2,000,000, a uniform casting operation may be difficult. Here, the weight-average molecular weight of the adhesive polymers including (meth)acryl-based polymers may be obtained by, for example, gel permeation chromatography (GPC).

Further, the glass transition temperature (Tg) of the (meth)acryl-based polymer is preferably −85° C. or higher and 0° C. or lower, similarly from the viewpoint of providing adhesiveness under room temperature. This is because when the glass transition temperature exceeds 0° C., the tackiness of the adhesive composition decreases, and when the glass transition temperature is lower than −85° C., the peeling characteristics may decrease.

Further, although there is a case that a hydroxyl group may be contained in the (meth)acryl-based polymer, from the viewpoint of the mixing properties with the conductive polymer complex in the present invention, a hydroxyl value of the relevant polymer is 150 mgKOH/g or smaller, preferably 75 mgKOH/g or smaller, and more preferably 40 mgKOH/g or smaller.

(A2) Urethane-Based Polymer

Further, as the urethane-based polymer, one obtained by reacting a polyol compound with a polyisocyanate compound may be used. Various kinds of urethane-based polymers that can function as an adhesive agent, more specifically, an appropriate one from among ether-based polyurethanes, ester-based polyurethane, carbonate-based polyurethanes, or the like may be adopted.

Here, examples of the polyol compounds include polyether polyols, polyester polyols, polyacetal polyols, polycarbonate polyols and polycaprolactone polyols, and from the viewpoint of the number of —OH groups, diol compounds may be used. Examples of the polyisocyanate compounds include phenylene diisocyanate, diphenyl methane diisocyanate, tolylene diisocyanate and hexamethylene diisocyanate. Two or more kinds of these components may be used for reaction.

The urethane-based polymers of (A2) components have a weight-average molecular weight preferably of 3,000 or larger and 500,000 or smaller and more preferably of 5,000 or larger and 400,000 or smaller from the viewpoint of providing adhesiveness under room temperature. When the weight-average molecular weight is set to 3,000 or larger, the heat resistance of the obtained adhesive layer may be suppressed from drastically decreasing. Further, when the weight-average molecular weight is set to 500,000 or smaller, uniform casting may be readily performed.

(A3) Silicone-Based Polymer

The silicone-based polymer is a polymer having an organopolysiloxane in a main chain part. As the silicone-based polymers, various kinds of the silicone-based polymers that can function as the adhesive may be used, and any one of an addition reaction type, a peroxide reaction type and a condensation reaction type may be used.

A catalyst may be added to the silicone-based polymer to expedite a crosslinking reaction to obtain an adhesive layer having desired characteristics. As such catalyst, for example, platinum-based catalysts such as platinum fine powder, chloroplatinic acid and derivatives thereof may be used. Although an addition amount of the catalyst is not particularly limited, preferably 0.01 parts by mass, more preferably 0.10 parts by mass relative to 100 parts by mass of the silicone-based polymer may be set as a lower limit, for example. On the other hand, the upper limit of the addition amount of the catalyst may be preferably set to 5.0 parts by mass, and more preferably set to 1.0 part by mass.

(A4) Polyolefin-Based Polymer

As the polyolefin-based polymer, thermoplastic elastomers that show properties as an elastomer at normal temperature, and show thermoplasticity at high temperature may be preferably used. From the viewpoint of the flexibility or followability, one or two or more kinds of the thermoplastic elastomers such as olefin-based elastomers such as ethylene-propylene copolymers, ethylene-propylene-diene copolymers, ethylene-vinyl acetate copolymers, polybutene, polyisobutylene, and chlorinated polyethylene; styrene-based elastomers such as styrene-butadiene-styrene copolymers, styrene-ethylene/propylene-styrene copolymers, and styrene-ethylene/butylene-styrene copolymers; and thermoplastic elastomers such as thermoplastic polyester-based elastomers, thermoplastic polyurethane-based elastomers, and thermoplastic acryl-based elastomers may be used, and, among these, the thermoplastic elastomers having the glass transition temperature of room temperature or lower (for example, 20° C. or lower) may be preferably used.

In the adhesive composition of the present invention, the adhesive polymers may be used alone or in a combination of two or more kinds.

Further, the adhesive polymer may be preferably used for preparation of the adhesive composition in a state dissolved or dispersed in (C) a solvent or a dispersion medium described below for making it easy to prepare the adhesive composition.

Further, as the adhesive polymer of the present invention, the (meth)acryl-based polymers are preferred because these are excellent in the balance between the cost and the adhesive physical properties and transparency.

<(B) Conductive Polymer Complex>

The (B) conductive polymer complex contained in the adhesive composition of the present invention contains (B1) a conjugated polymer and (B2) a polyanion. More specifically, by oxidatively polymerizing monomers under the presence of the (B2) polyanion having a block copolymer structure to form a conjugated polymer, the (B) conductive polymer complex may be obtained.

A concentration of the (B) conductive polymer complex in the adhesive composition of the present invention is preferably 0.1 parts by mass or higher, more preferably 0.2 parts by mass or higher, still more preferably 0.5 parts by mass or higher, and further more preferably 0.8 parts by mass or higher relative to 100 parts by mass of the (A) adhesive polymer. By setting the concentration of the conductive polymer complex to 0.1 parts by mass or larger, when an adhesive layer is formed from the adhesive composition, the surface resistivity of the adhesive layer decreases. Therefore, static electricity may be suppressed from occurring when peeling the adhesive layer. On the other hand, a concentration of the (B) conductive polymer complex is preferably lower than 10.0 parts by mass, more preferably 8.0 parts by mass or lower, still more preferably 5.0 parts by mass or lower, and further more preferably 3.0 parts by mass or lower relative to 100 parts by mass of the (A) adhesive polymer. By setting the concentration of the conductive polymer complex to smaller than 10.0 parts by mass, the mixing stability of the adhesive composition may be improved and aggregated precipitates in the adhesive composition may be reduced, and, the light transmittance in the adhesive layer may be increased and the haze may be reduced.

(B1) Conjugated Polymer

As the conjugated polymer contained in the conductive polymer complex, a polythiophene present as an electrically conductive polymer is preferably contained.

Here, the polythiophene preferably includes a repeating unit of the general formula (I)

[Chem. 1]

(I)

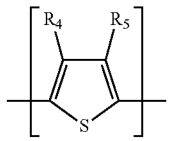

(in the formula, $R_4$ and $R_5$, independently from each other, respectively represent H, an optionally substituted $C_1$-$C_1$ alkyl radical or an optionally substituted $C_1$-$C_{18}$ alkoxy radical, and $R_4$ and $R_5$ together represent an optionally substituted $C_1$-$C_8$ alkylene radical (in the optionally substituted $C_1$-$C_8$ alkylene radical, one or more C atoms may be substituted by one or more identical or different heteroatoms selected from O or S, preferably a $C_1$-$C_8$ dioxyalkylene radical), an optionally substituted $C_1$-$C_8$ oxythiaalkylene radical or an optionally substituted $C_1$-$C_8$ dithiaalkylene radical, or an optionally substituted $C_1$-$C_8$ alkylidene radical (in the optionally substituted $C_1$-$C_8$ alkylidene radical, at least one C atom may be optionally substituted by a heteroatom selected from O and S)).

More preferably, the polythiophene includes repeating units of the general formula (I-a) and/or (I-b)

[Chem. 2]

(I-a)

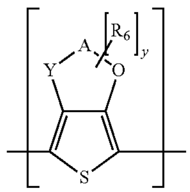

(I-b)

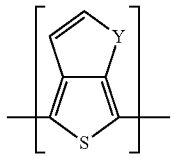

(in the formulas, A represents an optionally substituted $C_1$-$C_5$ alkylene radical, preferably an optionally substituted $C_2$-$C_3$ alkylene radical, Y represents O or S, $R_6$ represents a linear or branched, optionally substituted $C_1$-$C_{18}$ alkyl radical, preferably a linear or branched, optionally substituted $C_1$-$C_{14}$ alkyl radical, an optionally substituted $C_5$-$C_{12}$ cycloalkyl radical, an optionally substituted $C_6$-$C_{14}$ aryl radical, an optionally substituted $C_7$-$C_{18}$ aralkyl radical, an optionally substituted $C_7$-$C_{18}$ alkaryl radical, an optionally substituted $C_1$-$C_4$ hydroxyalkyl radical or a hydroxyl radical, and y represents an integer of from 0 to 8, preferably 0, 1 or 2, particularly preferably 0 or 1, in which, when a plurality of radicals $R_6$ are bonded to A, these may be identical or different).

Here, the general formula (I-a) is to be understood to mean that the substituent $R_6$ is bonded y times to the alkylene radical A.

More preferably, the polythiophene including repeating units of the general formula (I) is a polythiophene including repeating units of the general formula (I-aa) and/or of the general formula (I-ab)

[Chem. 3]

(I-aa)

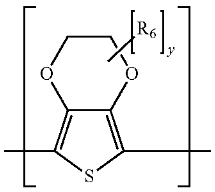

(I-ab)

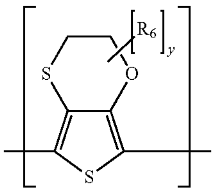

(in the formulas, $R_6$ and y have the meaning given above).

Most preferably, the polythiophene including repeating units of the general formula (I) is a polythiophene including a polythiophene of the general formula (I-aaa) and/or the general formula (I-aba).

[Chem. 4]

(I-aaa)

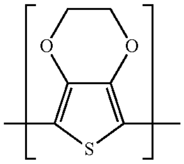

(I-aba)

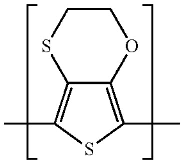

In the present specification, the prefix "poly" is understood to mean that a plurality of identical or different repeating units are included in the polythiophene. The polythiophene includes in total n repeating units of the general formula (I), wherein n may be an integer of from 2 to 2000, preferably 2 to 100. The repeating units of the general formula (I) within a polythiophene may be in each case identical with each other or different from each other. Polythiophene including in each case identical repeating units of the general formula (I) is preferred.

Preferably, each conjugated polymer has H at the end groups.

As the conjugated polymer, poly(3,4-ethylene-dioxythiophene), poly(3,4-ethyleneoxythiathiophene) or poly(thieno [3,4-b]thiophene), that is, a homopolythiophene having repeating units of the general formula (I-aaa), (I-aba) or (I-b) where Y═S is particularly preferred, and homopolymer (poly(3,4-ethylene-dioxythiophene)) including repeating units of the formula (I-aaa) is most preferred.

The conjugated polymers are cationic, wherein the "cationic" relates only to the charges located on the polythiophene main chain. Depending on the substituent of the radicals $R_4$ and $R_5$, the polythiophene may bear positive and negative charges in the structural unit, and in this case, the positive charges may be located on the polythiophene main chain and the negative charges may be optionally located on the radicals R substituted with sulphonate or carboxylate groups. In this case, the positive charges of the polythiophene main chain may be partially or completely saturated by the optionally present anionic groups on the radicals R. Considered as a whole, the polythiophenes in these cases may be cationic, neutral or even anionic. Nevertheless, in the context of the invention, they are all considered as cationic polythiophenes. This is because the positive charges on the polythiophene main chain are important. The positive charges are not represented in the formulas. This is because these positive charges are mesomerically delocalised. However, the number of positive charges is at least 1 and at most n (here, n is the total number of all repeating units (identical or different) within the polythiophene).

As a thiophene monomer that becomes a base of a conjugated polymer, optionally substituted 3,4-alkylenedioxythiophenes may be used, and, as an example, can be represented by the general formula (II)

[Chem. 5]

(II)

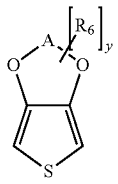

(in the formula, A, $R_6$ and y have the meaning cited in connection with formula (I-a), and when a plurality of radicals R are bonded to A, these may be identical or different).

As more preferred thiophene monomers, optionally substituted 3,4-ethylenedioxythiophenes may be used, most preferably, unsubstituted 3,4-ethylenedioxythiophene may be used.

(B2) Polyanion

As the polyanion contained as a dopant in the conductive polymer complex, one having a block copolymer structure may be used, for example, a sulfonated synthetic rubber is preferably used. The sulfonated synthetic rubber is a block copolymer having at least a partially sulfonated styrene unit and a diene unit. By using the polyanion having the block copolymer structure like this, formation of aggregated precipitates in the adhesive composition may be drastically reduced, the surface resistivity of the adhesive layer may be reduced, further, and the occurrence of the static electricity may be reduced when the adhesive layer formed of the adhesive composition is peeled.

In the present specification, the term "sulphonated" is preferably understood to mean that in the styrene units and/or diene units concerned, preferably in the optionally hydrogenated butadiene or isoprene units, an —$SO_3X$ group is bonded to at least one C atom of these units via a sulphur atom (X is preferably selected from the group consisting of $H^+$, $NH_4^+$, $Na^+$, $K^+$ and $Li^+$ and more preferably $H^+$.) It is particularly preferable when the —$SO_3X$ group is almost exclusively bonded to the styrene unit and accordingly sulphonated styrene units are present.

Further, in the present specification, the terms "hydrogenated, optionally partially alkyl-substituted styrene-diene block copolymers", or "hydrogenated, styrene-isoprene block copolymers" are understood respectively to refer to block copolymers, in which the double bond of the diene unit has been hydrogenated but the aromatic ring system of the styrene unit is not hydrogenated. Further, the term "styrene-diene block copolymers" is further understood to refer to a polymer which includes at least styrene and diene monomer units, and accordingly the presence of further co-monomers is not excluded.

Further, in the present specification, the term "alkyl-substituted styrene-diene block copolymers" is understood as referring to block copolymers in which the styrene unit is alkyl-substituted, whereby in particular a methyl group, an ethyl group, an isopropyl group or tert-butyl group is considered as an alkyl substituent.

A "sulphonated styrene unit" in this context is preferably understood to mean the unit (III),

[Chem. 6]

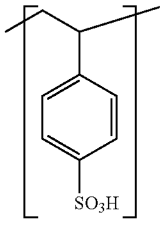

(III)

and on the other hand, a "sulphonated butadiene unit" is preferably understood to mean, for example, the unit (IV).

[Chem. 7]

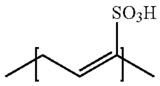

(IV)

Instead of the acid shown in units (III) and (IV), the sulphonate group may also be bonded in the form of a salt, for example in the form of an ammonium salt or an alkali salt, in particular in the form of an $Na^+$, $K^+$ or $Li^+$ salt.

Preferably, the hydrogenated or unhydrogenated, optionally partially alkyl-substituted styrene-diene copolymers contained in the complexes according to the invention as sulphonated synthetic rubber are preferably obtainable by sulphonating a styrene-diene copolymer (this may optionally be hydrogenated).

The hydrogenated or unhydrogenated, optionally partially alkyl-substituted styrene-diene copolymer may in principle be a styrene-diene block copolymer. A "block" in this context is understood to be a polymer unit consisting of at least 2, preferably at least 4, still more preferably at least 6, still more preferably at least 8 and most preferably at least 10 identical monomer units continuous with each other.

Therefore, the hydrogenated or unhydrogenated block copolymers may be copolymers in which only the styrene units are present in blocks, copolymers in which only the diene units (or the hydrogenated forms of the diene units) are present in blocks, or copolymers in which both the diene units (or the hydrogenated forms of the diene units) and the styrene units are present in blocks. Hydrogenated or unhydrogenated block copolymers in which for example styrene blocks are present in addition to monomeric styrene and diene units (or the hydrogenated forms of the diene units), hydrogenated or unhydrogenated block copolymers in which diene blocks (or blocks of the hydrogenated forms of the diene units) are present in addition to monomeric styrene units and diene units (or the hydrogenated forms of the diene units), hydrogenated or unhydrogenated block copolymers in which styrene blocks and diene blocks (or blocks of the hydrogenated forms of the diene units) are present in addition to monomeric diene units (or the hydrogenated form of the diene units), hydrogenated or unhydrogenated block copolymers in which styrene blocks and diene blocks (or blocks of the hydrogenated forms of the diene units) are present in addition to monomeric styrene units, or hydrogenated or unhydrogenated block copolymers in which styrene blocks and diene blocks (or blocks of the hydrogenated forms of the diene units) are present in addition to monomeric diene units (or the hydrogenated forms of the diene units) and monomeric styrene units are also conceivable.

According to a particular embodiment, the sulphonated synthetic rubber includes hydrogenated or unhydrogenated, preferably hydrogenated styrene-isoprene block copolymers having the structure A-B-A, in which the block A corresponds to a sulphonated polystyrene block and the block B corresponds to a hydrogenated or unhydrogenated, preferably however to a hydrogenated polyisoprene block (a fully hydrogenated polyisoprene block corresponds chemically to a block of alternating copolymerized ethylene-propylene units). The lengths of the blocks A and B are preferably at least 5 monomer units, particularly preferably at least 10 units and most preferably at least 20 units.

According to another specific embodiment, the sulphonated synthetic rubber includes the hydrogenated or unhydrogenated, preferably, a hydrogenated styrene-isoprene block copolymer having a structure of A-B-C-B-A in which the block A corresponds to a polystyrene block which is at least partially substituted with tert-butyl groups, the block B corresponds to a hydrogenated or unhydrogenated, preferably however to a hydrogenated polyisoprene block (a fully hydrogenated polyisoprene block corresponds chemically to a block of alternating copolymerized ethylene-propylene units) and the block C corresponds to a sulphonated polystyrene block. The lengths of the blocks A, B and C are preferably at least 5 monomer units, particularly preferably at least 10 units, and most preferably at least 20 units. Such copolymers are obtainable, for example, from the company Kraton Polymers, Houston, USA, under the product name NEXAR®.

There are no limits in principle regarding the mass ratio of styrene units to diene units in the hydrogenated or unhydrogenated styrene-diene block copolymer used for sulphonation. For example, the block copolymer may be based on 5 to 95% by mass, particularly preferably 15 to 80% by mass and most preferably 25 to 65% by mass of polymerized styrene and 95 to 5% by mass, preferably 80 to 15% by mass and most preferably 65 to 25% by mass of polymerized, optionally hydrogenated diene, whereby the total amount of optionally hydrogenated diene and styrene is preferably 100% by mass. However, the total amount does not need to be 100% by mass when further monomer units are present in the block copolymer in addition to the styrene units and the optionally hydrogenated diene units.

In conjunction with the sulphonated synthetic rubber, this sulphonated synthetic rubber is furthermore preferable to have a weight-average molecular weight (Mw) in the range of from 1000 to 10,000,000 g/mol, particularly preferably in the range of from 10,000 to 1,000,000 g/mol and most preferably in the range of from 100,000 to 1,000,000 g/mol. The molecular weight is determined by gel permeation chromatography using polymers having defined molecular weights, in particular using polystyrene in the case of water-immiscible solvents or dispersion media, or using polystyrene sulphonic acid in the case of water-miscible solvents or dispersion media.

The mass ratio of the (B1) conjugated polymer to the (B2) polyanion (conjugated polymer:polyanion) in the conductive polymer complexes is preferably in the range of from 1:0.1 to 1:100, more preferably in the range of from 1:0.2 to 1:20 and further preferably in the range of from 1:0.5 to 1:10.

(B3) Oxidant and Reactant Thereof

An oxidant or its reactant may be contained in the conductive polymer complex. This is because a polymerization reaction of a thiophene monomer under the presence of the sulfonated synthetic rubber is oxidatively performed by using an oxidant.

As the oxidant, for practical reasons, inexpensive and easy-to-handle oxidants are preferred, for example iron (III) salts such as $Fe_2(SO_4)_3$, $FeCl_3$, $Fe(ClO_4)_3$ and the iron(III) salts of organic acids and the iron (III) salts of inorganic acids including organic radicals may be used. The iron (III) salts of sulphuric acid hemiesters of $C_1$-$C_{20}$ alkanols, for example the Fe (III) salt of lauryl sulphate, are cited by way of example of iron (III) salts of inorganic acids including organic radicals. The followings are cited by way of example of the iron(III) salts of organic acids: the Fe(III) salts of $C_1$-$C_{20}$ alkyl sulphonic acids, such as methane sulphonic acid and dodecane sulphonic acid; Fe (III) salts of aliphatic $C_1$-$C_{20}$ carboxylic acids such as 2-ethylhexyl carboxylic acid; Fe (III) salts of aliphatic perfluorocarboxylic acids, such as trifluoroacetic acid and perfluorooctanoic acid; Fe (III) salts of aliphatic dicarboxylic acids such as oxalic acid; and, above all, Fe (III) salts of aromatic sulphonic acids optionally substituted with $C_1$-$C_{20}$ alkyl groups, such as benzenesulphonic acid, p-toluenesulphonic acid and dodecylbenzenesulphonic acid. The iron (III) salts of organic acids have the big applicational advantage that they are partially or completely soluble in organic solvents and in particular in water-immiscible organic solvents. Further, organic peroxides such as tert-butyl peroxide, diisobutyryl peroxide, di-n-propyl peroxydicarbonate, didecanoyl peroxide, dibenzoyl peroxide, tert-butyl peroxybenzoate, di-tert-amyl peroxide may also be used as oxidants. For example, organic azo compounds such as 2,2'-azodiisobutyronitrile and inorganic oxidants such as ammonium persulfate may also be used. As the oxidation agents such as Fe (III) salts and organic peroxides are possible to use, but preferably use of organic peroxides.

<(C) Solvent or Dispersion Medium>

The adhesive composition of the present invention includes a nonaqueous solvent or dispersion medium. More specifically, a solvent or dispersion medium in which concentration of water in the solvent or dispersion medium is preferably smaller than 1% by mass, more preferably smaller than 0.5% by mass, and still more preferably smaller than 0.1% by mass is included. By using such nonaqueous solvents or nonaqueous dispersion media, dissolution and dispersion of the adhesive polymer in the adhesive composition may be expedited, and thereby, formation of aggregated precipitates in the adhesive composition may be reduced. Further, by using the nonaqueous solvent or nonaqueous dispersion medium, the surface resistivity of the adhesive layer may be reduced, and the peeling electrification voltage of the adhesive sheet may be reduced. Here, the concentration of water may be measured by means of, for example, the Karl Fischer titration method.

As the solvents and dispersion media, linear, branched or cyclic aliphatic hydrocarbons such as pentane, hexane, heptane, octane, petroleum ether, cyclohexane, methyl cyclohexane or cycloheptane; aromatic hydrocarbons such as benzene, toluene or xylene; ethers such as diethyl ether, diisopropyl ether, methyl tert-butyl ether or anisole; halogenated hydrocarbons such as dichloromethane, chloroform, tetrachloromethane, trichloroethane and trichloroethene; halogenated aromatic hydrocarbons such as chlorobenzene; aliphatic nitriles such as for example acetonitrile; aliphatic sulphoxides and sulphones such as dimethyl sulphoxide or sulpholane; aliphatic carboxylic acid amides such as methyl acetamide, dimethyl acetamide or dimethyl formamide; ketones such as acetone, methyl ethyl ketone or methyl t-butyl ketone; esters such as methyl acetate, ethyl acetate or butyl acetate; or mixtures of these are cited.

(C) A content of the (C) solvent or dispersion medium is preferably adjusted to for example 10 parts by mass or higher, more preferably 25 parts by mass or higher, further more preferably 100 parts by mass or higher relative to 100 parts by mass of the (A) adhesive composition. Further, a content of the (C) solvent or dispersion medium is preferably adjusted to for example 50,000 parts by mass or lower, more preferably 10,000 parts by mass or lower, further more preferably 1,000 parts by mass or lower, relative to 100 parts by mass of the (A) adhesive composition.

<Other Components>

In the adhesive composition according to the present invention, as the other components than the above components, any conventionally well-known compound may be mixed. Further, various components such as conductivity enhancing aids for enhancing the conductivity of the conductive polymer complex may be contained.

On the other hand, a concentration of metal ions in the adhesive composition is preferably adjusted to lower than 10,000 ppm, more preferably to lower than 1,000 ppm, and still more preferably to lower than 10 ppm by mass ratio to the conductive polymer complex. By adjusting the concentration of the metal ion to 10,000 ppm or smaller, formation of aggregated precipitates in the adhesive composition may be reduced, and further, since temporal variation of the viscosity of the adhesive composition may be suppressed, the storability of the adhesive composition may be enhanced. Further, by adjusting the concentration of metal ions to lower than 10,000 ppm, the surface resistivity when the adhesive layer is prepared from the adhesive composition may be reduced, and the light transmittance of the adhesive layer may be enhanced.

Here, as the metal ions of which the content should be reduced in the adhesive composition, Na, K, Mg, Ca, Fe, Co, Ni, Cu, Zn, Ti, and Pd ions are cited. On the other hand, A1 that is used as a curing agent of (meth)acyl-based polymers, and Pt that is used as a curing agent of silicone-based polymers are not contained in the "metal ions" in the present specification.

<Characteristics of Adhesive Composition>

Preferably, the adhesive composition of the present invention is one that can form an adhesive layer having low surface resistivity. For example, when an adhesive layer is formed and dried such that a dry film thickness is 10 μm, the surface resistivity of the adhesive layer is preferably smaller than $1\times10^{13}\Omega/\square$, more preferably smaller than $1\times10^{12}\Omega/\square$, still more preferably smaller than $1\times10^{11}\Omega/\square$, and further more preferably smaller than $1\times10^{10}\Omega/\square$. According to the adhesive composition of the present invention, an adhesive layer in which the surface resistivity is low and the occurrence of the static electricity when peeled is reduced may be formed. By forming the adhesive layer like this, high antistatic properties may be exhibited. Therefore, contamination due to attachment of extraneous materials such as dust or dirt due to the electrification of static electricity to an attached object of the adhesive layer may be reduced.

Preferably, the adhesive composition of the present invention is one that can form an adhesive layer having high total light transmittance and low haze. The total light transmittance when an adhesive layer having a dry film thickness of, for example, 10 μm is formed and dried is preferably 80% or higher, more preferably 85% or higher, still more preferably 90% or higher, and furthermore preferably 93% or higher. Further, the haze in this adhesive layer at this time is preferably 3% or lower, more preferably 2% or lower, and still more preferably 1% or lower. By forming the adhesive layer having a high total light transmittance or a low haze like this, the transparency of the adhesive layer may be enhanced, and therefore, also in applications of optical members and electronic components including FPDs, the adhesive composition of the present invention may be preferably used.

Here, the haze (haze degree) in the adhesive layer is obtained from (Td/Tt)×100 when the total light transmittance is assumed as Tt and the diffusion transmittance is assumed as Td.

<<About Adhesive Sheet>>

The adhesive sheet of the present invention is obtained by providing the adhesive layer formed from the adhesive composition to a substrate.

<Substrate>

The substrate used in the adhesive sheet is selected from materials to which the adhesive layer may be adhered. For example, plastic materials, metals and metal oxides may be used. Here, when used in applications where light is transmitted via the adhesive sheet, substrates having high light transmittance, for example, substrates made of plastic materials having high light transmittance, ITO (indium tin oxide), or glass are preferably used.

Among these, in particular, from the viewpoint of using in applications of a surface protect film of optical components and electronic components such as FPDs, plastic films having plasticity and high light transmittance are preferably used. Examples of the plastic films like this include films made of polymers such as Oriented PolyPropylene (OPP), polycarbonate, polyesters such as polyethylene terephthalate (PET) and polyethylene naphthalate (PEN), or polymers such as polymethylmethacrylates (PMMA), polycarbonates, polysulfones, polyether sulfones (PES), polyimides, polyamides, polyethylenes, polypropylenes or cyclic polyolefin or cyclic olefin copolymers (COC), polyvinyl chloride, polystyrene, hydrogenated styrene copolymers, or hydrogenated styrene copolymers. In particular, from the viewpoint that the content of the conductive polymer makes it easier to form a conductive path in the inside of the adhesive layer, the conductive polymer having the surface free energy of 30 mN/m or smaller or 40 mN/m or larger is preferably used, and OPP or PET is more preferably used.

A thickness of the substrate is appropriately set in accordance with its application. For example, from the viewpoint of application to the surface protect film, a film thickness is set to preferably 5 μm or thicker, more preferably 10 μm or thicker, and more preferably 25 μm or thicker. The upper limit of the thickness of the substrate at this time may be set to preferably 5000 μm or thinner, more preferably 2500 μm or thinner, and still more preferably 1000 μm or thinner.

Here, a surface of the substrate may be pre-treated prior to applying the adhesive layer, for example by corona treatment, primer treatment, flame treatment, fluorination or plasma treatment, to improve the polarity of the surface, more specifically, the wettability and chemical affinity to the adhesive composition.

A surface of the substrate pretreated as need arises has a specific surface free energy Y. Here, when a surface free energy in a surface of a coated film obtained when the adhesive polymer is coated alone is assumed as X, and a surface free energy in a surface of a coated film obtained when the conductive polymer complex is coated alone is assumed as Z, the following formulas (a) and (b) are preferable to be satisfied.

[Math.5]

$$|X-Y|\geq 3.0\ \text{mN/m} \quad (a)$$

[Math.6]

$$X\leq Z\leq Y \text{ or } Y\leq Z\leq X \quad (b)$$

By satisfying the formulas (a) and (b) of the surface free energies X, Y and Z, when the adhesive layer is formed from the adhesive composition, at an interface between the substrate and the adhesive polymer, the conductive polymer complexes are likely to gather so as to alleviate the difference of the surface free energies. Thus, even when the content of the conductive polymer complex is scarce, a conductive path is likely to be readily formed at least in the inside of the adhesive layer. Therefore, the total light transmittance of the adhesive layer is enhanced and the haze may be made smaller, and the surface resistivity of the adhesive layer may be made smaller.

Further, when a surface free energy in a surface of a coated film obtained when the adhesive polymer is coated alone is assumed as X, and a surface free energy in a surface of a coated film obtained when a solution containing the adhesive polymer and the conductive polymer complex at the same rate with the adhesive composition is coated is assumed as W, the following formula (c) is preferable to be satisfied.

[Math.7]

$$|X-W|\geq 0.1\ \text{mN/m} \quad (c)$$

Here, a value of |X−W| is set preferably to 0.1 mN/m or larger, more preferably to 0.5 mN/m or larger, and still more preferably to 1.5 mN/m or larger. When |X−W| becomes 0.1 mN/m or larger, the conductive polymer tends to be abundant on a surface of the coated film. That is, even when the content of the conductive polymer is scarce, the conductive path is likely to be readily formed in a surface of the adhesive layer. Therefore, the total light transmittance of the adhesive layer is enhanced and the haze may be made smaller, and the surface resistivity of the adhesive layer may be made larger.

Further, when a surface free energy in a surface of the substrate is assumed as Y, and a surface free energy in a surface of a coated film obtained when a solution containing the adhesive polymer and the conductive polymer complex at the same rate with the adhesive composition is coated is assumed as W, the following formula (d) is preferable to be satisfied.

[Math.8]

$$|Y-W|\geq 4.0\text{ mN/m} \quad (d)$$

By satisfying the formula (d) of the surface free energies Y and W, the difference of the surface free energies of the substrate and the coated resin becomes larger, and thus, at least on the substrate side, or on any one of dried surfaces, the conductive polymers are eccentrically located. Therefore, it is easier for the conductive polymer complexes to gather in a specific region of the adhesive layer. Since even when the content of the conductive polymer is scarce, the conductive path is likely to be readily formed in the inside of the adhesive layer. Therefore, the total light transmittance of the adhesive layer is enhanced and the haze may be made smaller, and the surface resistivity of the adhesive layer may be made higher.

The surface free energies W, X, Y and Z are obtained by measuring contact angles of a fluid paraffin and glycerin to target materials, followed by calculating therefrom. Here, values of the surface free energies Y in the main substrates are as shown below.

TABLE 1

| Material of substrate | Surface free energy [mN/m] |
|---|---|
| OPP | 26.8 |
| Polyethylene (PE) | 33.9 |
| Polycarbonate (PC) | 37.7 |
| Polystyrene (PSt) | 37.9 |
| PMMA | 40.6 |
| Hard polyvinyl chloride | 41 |
| Glass | 43.4 |
| PET (After primer treatment) | 45.6 |
| PET (No pretreatment) | 51.4 |
| PET (After Corona treatment) | 61.5 |

<Formation of Adhesive Layer>

By applying the adhesive composition to a substrate pre-treated as need arises, an adhesive sheet provided with an adhesive layer may be obtained. Here, as the means for applying the adhesive composition, known methods, for example, spin coating, dipping (immersing), pouring, dropping on, injecting, spraying, doctor blade coating, coating or printing may be used. Among these, as the means for printing, inkjet printing, screen printing, relief printing, offset printing or pad printing may be used.

A film thickness before drying of the adhesive composition provided to the substrate is set in accordance with a concentration of a non-volatile component in the adhesive composition or a thickness of the adhesive layer after drying. For example, the adhesive composition may be applied to the substrate at a thickness of preferably 1 μm or thicker, more preferably 5 μm or thicker, and may be applied to the substrate at a thickness of preferably 1000 μm or thinner, and more preferably 150 μm or thinner.

Next, by removing at least partially the organic solvent from the adhesive composition applied on the substrate, an adhesive layer may be obtained. The organic solvent may be partially removed by drying at a temperature of from 20° C. to 200° C. Here, in particular, when a polymer that is cured by a crosslinking reaction or the like is used as the adhesive polymer, together with the partial removal of the organic solvent, the polymer may be cured.

<Adhesive Layer>

Preferably, the adhesive layer that is laminated on the substrate in the adhesive sheet has low surface resistivity. By using the adhesive layer having low surface resistivity like this, occurrence of static electricity when the adhesive sheet is peeled may be reduced. Thus, since high antistatic properties may be exhibited, contamination due to attachment of extraneous materials such as dust or dirt due to the electrification to an object adhered to the adhesive sheet may be reduced.

Here, the antistatic properties when the adhesive sheet is peeled may be evaluated by, for example, the peeling electrification voltage. As a peeling charge amount in the adhesive sheet of the present invention, the peeling charge amount when adhering to an adherend made of triacetyl cellulose followed by peeling at a speed of 30 m/min is preferably 0.9 kV or lower, more preferably 0.7 kV or lower, still more preferably 0.5 kV or lower, and further more preferably 0.3 kV or lower.

A film thickness of the adhesive layer is set according to the kind of adhesive polymer, and the adhesive layer has for example a film thickness of 0.1 μm or thicker, more preferably 1 μm or thicker, and still more preferably 5 μm or thicker. On the other hand, this adhesive layer has a film thickness of, for example, 100 μm or thinner, more preferably 50 μm or thinner, and still more preferably 30 μm or thinner.

<Applications of Adhesive Sheet>

Although applications of the adhesive sheet of the present invention are not particularly limited, it may preferably be used as a surface protective film (protect film) adhered to polarization plates, retardation plates, ecliptic polarization plats or the like used when forming, for example, a liquid crystal element.

EXAMPLES

Although the present invention will be described in more detail in the following Examples, the present invention is by no means limited by these descriptions.

Preparation of Adhesive Polymer Solution

Experimental Example A-1

As the adhesive polymer, a copolymer of 2-ethylhexyl acrylate and 2-hydroxyethyl acrylate (weight-average molecular weight: 500,000) was prepared according to the following procedure. First, to a flask provided with a stirrer, a nitrogen gas introducing pipe, a thermometer and a reflux cooling pipe, 2-ethylhexyl acrylate (285 g), 2-hydroxyethyl acrylate (15 g), ethyl acetate (350 g) and toluene (230 g) were charged, followed by heating the content of the flask to 66° C. while introducing nitrogen gas into the flask. Then, 0.15 parts of sufficiently nitrogen gas substituted azobisisobutyllonitrile (AIBN) was added into the flask under stirring. Heating and cooling were performed for three hours such that the temperature of the content of the flask was maintained at 65 to 66° C. After that, by heating to 75° C. and by performing reflux for 5 hours, finally toluene (120 g) was added, and an adhesive polymer solution was obtained. A weight-average molecular weight (Mw) of the adhesive polymer was measured according to the following measurement conditions of gel permeation chromatography (GPC). Also, a heating residue (nV) at 105° C. was measured and found to have a solid content of 30%.

<GPC Measurement Condition>

Measurement Device: HLC-8120GPC (manufactured by TOSOH Corporation)

GPC Column Configuration: The following 5 Consecutive Column Configuration (all manufactured by TOSOH Corporation)

(1) TSK-GEL HXL-H (Guard Column)
(2) TSK-GEL G7000HXL
(3) TSK-GEL GMHXL
(4) TSK-GEL GMHXL
(5) TSK-GEL G2500HXL Sample concentration: Diluted with tetrahydrofuran so as to be 1.0 mg/$cm^3$ Mobile phase solvent: Tetrahydrofuran Flow rate: 1 ml/min Column temperature: 40° C.

<Measurement Method of Heating Residue (nV) at 105° C.>

Into a precisely measured tin petri dish (n1), about 1 g of an acryl-based copolymer solution was poured, followed by heating at 105° C. for 3 hours. After that, this tin petri dish was left to stand in a desiccator at room temperature for 1 hour, followed by precisely measuring again to measure a total weight (n3) after heating. By using obtained weight measurement values (n1 to n3), the heating residue (nV) was calculated from the following formula. Heating residue (%)=100×[weight after heating (n3−n1)/weight before heating (n2−n1)]

Experimental Example A-2

As an adhesive polymer, as a sample made of a copolymer (weight-average molecular weight: 500,000) of n-butyl acrylate (95 parts by mass) and acrylic acid (5 parts by mass) and a mixed liquid of toluene and ethyl acetate (toluene: ethyl acetate=50:50 (mass ratio)), an adhesive polymer solution A-2 was obtained according to a procedure similar to Experimental Example A-1.

Experimental Example A-3

As an adhesive polymer, as a sample made of a copolymer (weight-average molecular weight: 500,000) of 2-methoxyethyl acrylate (72 parts by mass), 2-hydroxyethyl acrylate (2 parts by mass), acrylic acid (1 part by mass), and methyl methacrylate (25 parts by mass) and a mixed liquid of toluene and ethyl acetate (toluene:ethyl acetate=50:50 (mass ratio)), an adhesive polymer solution A-3 was obtained according to a procedure similar to Experimental Example A-1.

Experimental Example A-4

As an urethane-based adhesive polymer, TAKELAC A-515 (manufactured by Mitsui Chemicals Inc.) was used. TAKELAC A-515 is a reactant of diol and polyisocyanate (JP 2013-222526 A).

Experimental Example A-5

As a silicone-based adhesive polymer, Dow Corning Toray SD 4587 L PSA (manufactured by Dow Corning Toray Co., Ltd.) was used. As a platinum catalyst in an addition curing reaction, NC-25 CATALYST was used. These were mixed at a mixing ratio of 150/0.9.

Experimental Example A-6

As a polyolefin-based adhesive polymer, an adhesive polymer solution A-6 made of Septon 2002 (manufactured by Kuraray Co., Ltd.)(100 parts by mass), FMR-0150 (manufactured by Mitsui Chemicals Inc.)(20 parts by mass), LV-100 (manufactured by JX Nippon Oil & Energy Corporation)(20 parts by mass) and toluene was used.

Preparation of Conductive Polymer Complex

Experimental Example B-1

Anisole (262 g), benzoyl peroxide (9.4 g), a solution of a sulphonated block polymer that is polyanion (Kraton Nexar MD9260, non-volatile content: 11%) (75 g), and p-toluene sulphonic acid (2.8 g) were mixed and stirred under a nitrogen atmosphere for 30 minutes. After heating to 60° C., 3,4-ethylene dioxythiophene (4.95 g) that is a monomer of a conjugated polymer was added, followed by dropping additional anisole (20 g) for 40 minutes. After that, stirring was performed at 60° C. for 3 hours. After returning to room temperature, the obtained dispersion liquid was left to stand, a supernatant was taken out by decantation and a dispersion liquid of the conductive polymer complex was obtained. At this time, a content of water contained in the dispersion liquid was 172 ppm to a total mass of the dispersion medium.

Experimental Example B-2

In the present experimental example, a solvent dispersion liquid of PEDOT was manufactured without using a polyanion.

3,4-ethylenedioxythiophene (EDOT) that is a monomer of a conjugated polymer (1.42 g) and paratoluene sulfonic acid monohydrate (PTS-$H_2O$)(2.56 g) were dissolved or dispersed in water (120 g), followed by adding ammonium persulfate (3.1 g) that is an oxidant and ferric sulphate (0.08 g) thereto to polymerize the monomer, and thus the PEDOT/PTS was obtained. After the obtained PEDOT/PTS was subjected to a solid-liquid separation, one taken out as a wet product was subjected to freeze-drying to remove water.

The obtained PEDOT/PTS powder (0.2 g) was added to methyl ethyl ketone (MEK) (10 g) that is a solvent or a dispersion medium and subjected to ultrasonic dispersion, and thus a dispersion liquid of the PEDOT/PTS was prepared. At this time, the content of water contained in a PEDOT/PTS dispersion liquid was 322 ppm to a total mass of the dispersion medium.

Experimental Example B-3

In the present experimental example, with an aqueous dispersion of the PEDOT/PSS, an operation for substituting the dispersion medium with an organic solvent was performed.

By freeze-drying a PEDOT/PSS dispersion liquid having a non-volatile component of 1.2% (Clevios P T2 manufactured by Heraeus), a dried PEDOS/PSS was obtained.

By mixing 1.0 g of the obtained PEDOT/PSS powder and 49.0 g of propylene glycol, an auxiliary dispersion liquid was obtained. Then, 0.5 g of butyl amine and 200 g of methyl ethyl ketone were added, followed by ultrasonically dispersing, and thus a solvent dispersion liquid of a butyl amine modified product of the PEDOT/PSS was prepared. At this time, a content of water contained in the dispersion liquid of the PEDOT/PSS modified product was 298 ppm relative to the total mass of the dispersion medium.

Experimental Example B-4

In the present experimental example, an iron (III) salt was used as an oxidant, and a metal ion was contained in a solvent dispersion liquid of the conductive polymer.

Under the same conditions except that in place of benzoyl peroxide in the Experimental Example B-1, iron (III) tris(4-methylbenzene sulfonate)($Fe(PTS)_3$) (23.9 g) was used, a dispersion liquid of the conductive polymer complex was obtained. At this time, a content of water contained in the dispersion liquid was 184 ppm relative to the total mass of the dispersion medium.

<Preparation of Adhesive Composition>

In the followings, contents of the respective components, concentrations of metal ions contained in the adhesive compositions, kinds of substrates, surface free energies X, W, Y, Z, and characteristic values of the adhesive compositions and the adhesive layers in Examples 1 to 12 and Comparative Examples 1 to 4 are shown.

TABLE 2

| | Adhesive polymer (A) | | Conductive polymer complex (B) | Solvent/dispersion medium (C) | | | | Surface free energy [mN/m] | | | |
|---|---|---|---|---|---|---|---|---|---|---|---|
| | Kind | Content (Parts by mass) | Kind | Content (Parts by mass) | Content (Parts by mass) | Concentration of metal ion [ppm] | Substrate | X | W | Y | Z |
| Example 1 | A-1 | 100 | B-1 | 0.2 | 525 | <1 | Primer PET | 34.3 | 33.6 | 45.6 | 36.8 |
| Example 2 | A-1 | 100 | B-1 | 1 | 525 | <1 | Primer PET | 34.3 | 32.7 | 45.6 | 36.8 |
| Example 3 | A-1 | 100 | B-1 | 5 | 526 | <1 | Primer PET | 34.3 | 31.1 | 45.6 | 36.8 |
| Example 4 | A-2 | 100 | B-1 | 1 | 525 | <1 | Primer PET | 3.38 | 32.6 | 45.6 | 36.8 |
| Example 5 | A-3 | 100 | B-1 | 1 | 525 | <1 | Primer PET | 37.3 | 32.7 | 45.6 | 36.8 |
| Example 6 | A-1 | 100 | B-1 | 1 | 525 | <1 | OPP | 34.3 | 32.8 | 26.8 | 36.8 |
| Example 7 | A-1 | 100 | B-1 | 1 | 525 | <1 | Corona-treated PET | 34.3 | 33.0 | 61.5 | 36.8 |
| Example 8 | A-1 | 100 | B-4 | 1 | 525 | 17,300 | Primer PET | 34.3 | 33.7 | 45.6 | 35.7 |
| Example 9 | A-1 | 100 | B-1 | 1 | 525 | <1 | PC | 34.3 | 32.8 | 37.7 | 36.8 |
| Example 10 | A-4 | 100 | B-1 | 1 | 525 | <1 | Primer PET | 36.2 | 36.1 | 45.6 | 36.8 |
| Example 11 | A-5 | 100 | B-1 | 1 | 525 | <1 | Primer PET | 24.1 | 28.8 | 45.6 | 36.8 |
| Example 12 | A-6 | 100 | B-1 | 1 | 525 | <1 | Primer PET | 29.4 | 30.3 | 45.6 | 36.8 |
| Comparative Example 1 | A-1 | 100 | B-1 | 0.05 | 525 | <1 | Primer PET | 34.3 | 34.1 | 45.6 | 36.8 |
| Comparative Example 2 | A-1 | 100 | B-1 | 15 | 529 | <1 | Primer PET | 34.3 | 30.3 | 45.6 | 36.8 |
| Comparative Example 3 | A-1 | 100 | B-2 | 1 | 525 | <1 | Primer PET | 34.3 | 33.8 | 45.6 | — |
| Comparative Example 4 | A-1 | 100 | B-3 | 1 | 525 | <1 | Primer PET | 34.3 | 35.2 | 45.6 | 38.9 |

※Primer PET: PET after surface pretreatment by a primer (DIA FOIL T680E100, manufactured by Mitsubishi Chemical Corporation)

OPP: Oriented PolyPropylene

Corona-treated PET: PET after surface pretreatment by Corona treatment

※※Regarding the surface free energy Z of conductive polymer complex B-2, the surface free energy could not be calculated, since when the conductive polymer complex B-2 was coated alone, a uniform film sample for contact angle measurement could not be obtained.

TABLE 3

| | \|X − Y\| | Whether the formula (b) is satisfied | \|X − W\| | \|Y − W\| | Mixing stability | Thickening properties | Surface resistivity [Ω/□] | Total light transmittance [%] | Haze [%] | Peeling electrification voltage [kV] |
|---|---|---|---|---|---|---|---|---|---|---|
| Example 1 | 11.3 | ○ | 0.7 | 12.0 | ○ | ○ | $1 \times 10^{10}$ | 98.1 | 0.1 | 0.29 |
| Example 2 | 11.3 | ○ | 1.6 | 12.9 | ○ | ○ | $6 \times 10^{9}$ | 94.3 | 0.7 | 0.10 |
| Example 3 | 11.3 | ○ | 3.2 | 14.5 | ○ | ○ | $8 \times 10^{8}$ | 89.4 | 2.1 | 0.02 |
| Example 4 | 11.8 | ○ | 1.2 | 13.0 | ○ | ○ | $9 \times 10^{9}$ | 94.6 | 0.6 | 0.09 |
| Example 5 | 8.3 | x | 4.6 | 12.9 | ○ | ○ | $2 \times 10^{10}$ | 94.5 | 0.6 | 0.08 |
| Example 6 | 7.5 | ○ | 1.5 | 6.0 | ○ | ○ | $9 \times 10^{9}$ | 94.7 | 0.7 | 0.10 |
| Example 7 | 27.2 | ○ | 1.3 | 28.5 | ○ | ○ | $6 \times 10^{9}$ | 94.5 | 0.7 | 0.08 |
| Example 8 | 11.3 | ○ | 0.6 | 11.9 | ○ | x | $8 \times 10^{12}$ | 93.9 | 1.6 | 0.82 |
| Example 9 | 3.4 | ○ | 1.5 | 4.9 | ○ | ○ | $8 \times 10^{11}$ | 94.4 | 0.7 | 0.67 |
| Example 10 | 9.4 | ○ | 0.1 | 9.5 | ○ | ○ | $7 \times 10^{10}$ | 94.2 | 0.7 | 0.10 |
| Example 11 | 21.5 | ○ | 4.7 | 14.8 | Δ | ○ | $3 \times 10^{12}$ | 93.9 | 0.8 | 0.43 |
| Example 12 | 16.2 | ○ | 0.9 | 15.3 | ○ | ○ | $9 \times 10^{10}$ | 94.4 | 0.6 | 0.11 |
| Comparative Example 1 | 11.3 | ○ | 0.2 | 11.5 | ○ | ○ | $1 \times 10^{15}$ | 99.3 | 0.1 | 1.56 |
| Comparative Example 2 | 11.3 | ○ | 4.0 | 15.3 | x | ○ | $1 \times 10^{7}$ | 74.9 | 3.1 | 0.01 |
| Comparative Example 3 | 11.3 | — | 0.5 | 11.8 | x | ○ | $4 \times 10^{13}$ | 91.0 | 1.4 | 1.23 |
| Comparative Example 4 | 11.3 | ○ | 0.9 | 10.4 | x | ○ | $2 \times 10^{13}$ | 90.2 | 1.8 | 0.91 |

(A) Adhesive polymers, (B) conductive polymer complexes, and (C) solvents/dispersion media of the kinds shown in Table 2 were charged in a mixer so as to conform to the mass ratios shown in Table 2, followed by stirring and mixing, and thus the adhesive compositions were obtained.

<Evaluation of Characteristics of Adhesive Compositions>

Metal ion concentrations, mixing stability and thickening properties of the obtained adhesive compositions were evaluated.

(Evaluation of Metal Ion Concentration)

Regarding the concentrations of the metal ions contained in the adhesive compositions, quantitative analyses of Na, K, Mg, Ca, Fe, Co, Ni, Cu, Zn and Ti ions were performed by using an ICP Spectrophotometer (ICPE-90000, manufactured by Shimadzu Corporation).

As the results thereof, regarding Examples 1 to 7, 9 to 12 and Comparative Examples 1 to 4, total amounts of these ions were smaller than 1 ppm relative to the mass of the conductive polymer complex. On the other hand, regarding Example 8, it was found that mainly Fe ions have a high concentration of 17,300 ppm relative to the mass of the conductive polymer complex.

(Evaluation of Mixing Stability)

Among these, regarding the mixing stability, the presence of aggregated precipitates was visually confirmed in the adhesive compositions three days after mixing of the adhesive polymer and the conductive polymer complex. At this time, the adhesive composition in which the aggregated precipitate was not found was evaluated as "○", the adhesive composition in which the aggregated precipitates were slightly found was evaluated as "Δ", and the adhesive composition in which the aggregated precipitates were abundantly found was evaluated as "x".

As the result thereof, as shown in Table 3, in Examples 1 to 12, aggregated precipitates were hardly found, that is, all of these were evaluated as "○" or "Δ". On the other hand, Comparative Examples 2, 3 and 4 were evaluated as "x" because aggregated precipitates were found. From this, it is assumed that a decrease of the aggregated precipitates is exhibited by forming complexes of the conductive polymer by using polyanions having a block copolymer structure, by reducing the content of the conductive polymer complexes to the adhesive polymer, and by using a nonaqueous type solvent or dispersion medium as the solvent or dispersion medium.

(Evaluation of Thickening Properties)

Further, regarding the thickening properties of the adhesive compositions, after temporally accelerating by storing at 40° C. for one week in a constant temperature bath, the viscosity of the adhesive composition after temporal variation was measured by the same method, an increase rate of the viscosity between before and after storing at 40° C. for one week was calculated, and the thickening properties were evaluated in three grades according to the following criteria.

○: A case where the viscosity increase rate was 10% or smaller

Δ: A case where the viscosity increase rate was larger than 10% and 100% or smaller x: A case where the viscosity increase rate was larger than 100%

Here, the measurement of the viscosity was performed by measuring an initial viscosity at 25° C. using a viscometer (B II Type, manufactured by Toki Sangyo Co., Ltd.).

As the result thereof, as shown in Table 3, the viscosity increase rates of Examples 1 to 7 and 9 to 12 were 10% or smaller, and all of these were evaluated as "○". On the other hand, the viscosity increase rate of Example 8 exceeded 10% and was evaluated as "x". From this, it is assumed that, by reducing the content of the metal ions in the adhesive composition, the storability of the adhesive composition may be enhanced.

Characteristics Evaluation of Adhesive Layer

Further, the adhesive compositions of Examples 1 to 12 and Comparative Examples 1 to 4 were laminated on the substrates described in Table 2 such that a dry film thickness is 10 μm, followed by drying at a temperature of 90° C. for 5 minutes to form the adhesive layers, and thus the adhesive sheets were obtained. The surface resistivity, the total light transmittance, the haze, and the peeling electrification voltage of the obtained adhesive sheets were measured.

(Measurement of Surface Resistivity)

The surface resistivity was measured according to JIS-K-6911 at an input voltage of 1000 V under atmosphere of a temperature of 23° C. and humidity of 50% RH, by using a resistivity meter (Hi-Rester UX MCP-HT800, manufactured by Mitsubishi Chemical Analytech Co., Ltd.).

As the result thereof, as shown in Table 3, the surface resistivities of the adhesive layers of Examples 1 to 12 were smaller than $1\times10^{13}\Omega/\square$, more specifically $8\times10^{12}\Omega/\square$ or smaller. In particular, in Examples 1 to 7, 9, 10 and 12, the surface resistivities of the adhesive layers were smaller than $1\times10^{13}\Omega/\square$, more specifically $8\times10^{11}\Omega/\square$ or smaller. On the other hand, in Comparative Examples 1, 3 and 4, the surface resistivities of the adhesive layers were $1\times10^{13}\Omega/\square$ or larger. From this, the decrease of the surface resistivity of the adhesive layer is assumed to be achieved by forming the complex of the conductive polymer using a polyanion having a block copolymer structure, by increasing the content of the conductive polymer complex relative to the adhesive polymer, and by using a nonaqueous type solvent or dispersion medium as the solvent or the dispersion medium.

(Measurement of Surface Free Energy)

Surface free energy W in a surface of a coated film obtained when a solution containing the adhesive polymer and the conductive polymer complex at the same ratio as the adhesive composition is coated, a surface free energy X in a surface of a coated film obtained when the adhesive composition is coated alone, a surface free energy Y in a surface of the substrate, and a surface free energy Z in a surface of a coated film obtained when the conductive polymer complex is coated alone were obtained by measuring contact angles of fluid paraffin and glycerin to a surface of the substrate or a coated film using an automatic contact angle meter (OCA 15EC, manufactured by Data Physics Corp.), followed by calculating based on the average value of results of 5 measurements by applying them to the extended Fowkes equation and the Young equation.

As the result thereof, as shown in Table 3, in Examples 1 to 12, $|X-Y|$ is 3.0 [mN/m] or larger, $|X-W|$ is 0.1 [mN/m] or larger and $|Y-W|$ is 4.0 [mN/m] or larger, that is, all showed a high value.

(Measurement of Total Light Transmittance and Haze)

The adhesive layer was taken out by peeling the substrate from the obtained adhesive sheet and was adhered to transparent glass to prepare a test piece, followed by measuring the total light transmittance and the haze of the adhesive layer using a haze meter (HM-150, manufactured by Murakami Color Research Laboratory).

As the result thereof, as shown in Table 3, in Examples 1 to 12, the total light transmittances showed high values of 89% or higher, and the hazes showed small values of 2.1% or lower. On the other hand, in Comparative Example 2, the total light transmittance was low at 74.9%, and the haze had a high value of 3.1%. From this, it is assumed that an effect of enhancing the light transmittance and an effect of reducing the haze may be achieved by reducing the content of the conductive polymer complex relative to the adhesive polymer.

(Measurement of Peeling Electrification Voltage)

A laminate was formed by adhering an acryl plate (70 mm×150 mm×1 mm) and a polarization plate made of triacetyl cellulose (AG polarizing plate, plane polarizing plate) such that an AG surface and a plane surface of the polarization plate are located on outer sides, followed by neutralizing by a static eliminator (SJ-F300, manufactured by KEYENCE Corp.).

The adhesive sheets obtained in Examples and Comparative Examples were cut into 40 mm×150 mm, followed by pressure bonding on the AG surfaces and plane surfaces of the laminates that were neutralized in advance using a 2 kg rubber roller. After leaving for 1 day under a condition of air temperature of 25° C. and humidity of 65%, followed by neutralizing again, further followed by measuring a surface potential of the laminate when peeled at a peeling speed of 30 m/min and a peeling angle of 180° by a potential measurement device (SK-200, manufactured by KEYENCE Corp.).

As the result thereof, as shown in Table 3, in Examples 1 to 12, the peeling electrification voltages were 0.9 kV or smaller. In particular, in Examples 1 to 7 and 9 to 12, the peeling electrification voltages were 0.7 kV or smaller. On the other hand, in Comparative Examples 1, 3 and 4, the peeling electrification voltages were larger than 0.9 kV. From this, it is assumed that an effect of being capable of lowering the peeling electrification voltage of the adhesive sheet is achieved by forming a complex of the conductive polymer using a polyanion having the block copolymer structure, by including the conductive polymer complex at a predetermined amount or more relative to the adhesive polymer, and by using a nonaqueous type solvent or dispersion medium as the solvent or dispersion medium.

The invention claimed is:

1. An adhesive composition comprising:

(A) an adhesive polymer consisting of one of (meth)acryl-based polymer, urethane-based polymer, silicone-based polymer and polyolefin-based polymer;

(B) a conductive polymer complex including polythiophene present as an electrically conductive polymer, and a polyanion having a block copolymer structure; and (C) a nonaqueous solvent or dispersion medium, wherein the (meth)acryl-based polymer consists of a polymer of a (meth)acrylic acid ester component unit and a repeating unit derived from a monomer copolymerizable with the (meth)acrylic acid ester component unit, or a polymer of the (meth)acrylic acid ester component unit, the (meth)acryl-based polymer contains 50% by mass or more of the (meth)acrylic acid ester component unit in terms of monomers, wherein the (meth)acrylic acid ester component unit consists of an ester formed by reaction between an alcohol having only a linear or branched alkyl group having 1 to 20 carbon atoms, and acrylic acid or methacrylic acid, and/or an ester formed by reaction between an alicyclic alcohol having 3 to 14 carbon atoms, and acrylic acid or methacrylic acid, wherein the monomer copolymerizable with the (meth) acrylic acid ester component unit consists of one or a combination of (meth)acrylic acid, alkoxyalkyl (meth) acrylates, alkali metal (meth)acrylate salts, di(meth) acrylic acid esters of (poly)alkylene glycol, monoesters formed by reactions between (meth)acrylic acid and polypropylene glycol or polyethylene glycol, 2-hydroxyethyl (meth)acrylate, 2-hydroxypropyl (meth) acrylate, and 4-hydroxybutyl (meth)acrylate, wherein the conductive polymer complex is present in the composition in an amount of from 0.1 parts to less than 3 parts by mass relative to 100 parts by mass of the adhesive polymer, and wherein an adhesive layer obtained by forming and drying the adhesive composition such that a dry film thickness of the adhesive layer is 10 μm has a haze of 0.8% or smaller.

2. The adhesive composition according to claim 1, wherein the adhesive composition has a metal ion concentration lower than 10,000 ppm relative to the (B) conductive polymer complex.

3. The adhesive composition according to claim 1, wherein an adhesive layer obtained by forming and drying the adhesive composition such that a dry film thickness of the adhesive layer is 10 μm has surface resistivity of smaller than $1\times10^{13}\Omega/\square$, and a total light transmittance of 80% or higher.

4. An adhesive sheet comprising: an adhesive layer formed from the adhesive composition according to claim 1.

5. The adhesive sheet according to claim 4, wherein the adhesive layer is laminated on a surface of a substrate, and, when a surface free energy in a surface of a coated film obtained when the adhesive polymer is coated alone is assumed as X, a surface free energy in a surface of the substrate is assumed as Y, and a surface free energy in a surface of a coated film obtained when the conductive polymer complex is coated alone is assumed as Z, the following formula (a) and formula (b) are satisfied $$|X-Y|\geq 3.0 \text{ mN/m} \quad (a)$$

$$X\leq Z\leq Y \text{ or } Y\leq Z\leq X \quad (b)$$

6. The adhesive sheet according to claim 4, wherein when a surface free energy in a surface of a coated film obtained when the adhesive polymer is coated alone is assumed as X and a surface free energy in a surface of a coated film of a solution containing the adhesive polymer and the conductive polymer complex is assumed as W, the following formula (c) is satisfied $$|X-W|\geq 0.1 \text{ mN/m} \quad (c)$$

7. The adhesive sheet according to claim 4, wherein the adhesive layer is laminated on a surface of a substrate, and, when a surface free energy in a surface of the substrate is assumed as Y, and a surface free energy in a surface of a coated film of a solution containing the adhesive polymer and the conductive polymer complex is assumed as W, the following formula (d) is satisfied $$|Y-W|\geq 4.0 \text{ mN/m} \quad (d)$$

8. The adhesive sheet according to claim 4, wherein a peeling charge amount when adhering to an adherend made of triacetyl cellulose followed by peeling at a speed of 30 m/minute is 0.9 kV or smaller.

9. A protective film formed of the adhesive sheet according to claim 4.

10. The adhesive composition according to claim 2, wherein an adhesive layer obtained by forming and drying the adhesive composition such that a dry film thickness of the adhesive layer is 10 μm has surface resistivity of smaller than $1\times10^{13}\Omega/\square$, and a total light transmittance of 80% or higher.

11. An adhesive sheet comprising: an adhesive layer formed from the adhesive composition according to claim 2.

12. An adhesive sheet comprising: an adhesive layer formed from the adhesive composition according to claim 3.

13. The adhesive sheet according to claim 5, wherein a peeling charge amount when adhering to an adherend made of triacetyl cellulose followed by peeling at a speed of 30 m/minute is 0.9 kV or smaller.

14. The adhesive sheet according to claim 6, wherein a peeling charge amount when adhering to an adherend made of triacetyl cellulose followed by peeling at a speed of 30 m/minute is 0.9 kV or smaller.

15. The adhesive sheet according to claim 7, wherein a peeling charge amount when adhering to an adherend made of triacetyl cellulose followed by peeling at a speed of 30 m/minute is 0.9 kV or smaller.

16. A protective film formed of the adhesive sheet according to claim 5.

17. A protective film formed of the adhesive sheet according to claim 6.

18. A protective film formed of the adhesive sheet according to claim 7.

19. A protective film formed of the adhesive sheet according to claim 8.

* * * * *